United States Patent
Scarlett et al.

(10) Patent No.: US 6,546,705 B2
(45) Date of Patent: Apr. 15, 2003

(54) METHOD AND APPARATUS FOR CONTROLLING A TRACTOR/BALER COMBINATION

(75) Inventors: Andrew James Scarlett, Bedfordshire (GB); David Alexander Semple, Bedfordshire (GB); John Charles Lowe, Bedford (GB); Adrianus Naaktgeboren, Varsenare (BE); Bert J. F. Paquet, Sint-Andries (BE)

(73) Assignee: New Holland North America, Inc., New Holland, PA (US)

( * ) Notice: Subject to any disclaimer, the term of this patent is extended or adjusted under 35 U.S.C. 154(b) by 1 day.

(21) Appl. No.: 09/851,076

(22) Filed: May 8, 2001

(65) Prior Publication Data
US 2001/0042362 A1 Nov. 22, 2001

(30) Foreign Application Priority Data
May 13, 2000 (GB) ............................................. 0011522

(51) Int. Cl.[7] ............................................. A01D 75/00
(52) U.S. Cl. ..................... 56/10.2 R; 701/50
(58) Field of Search ...................... 56/10.2 R, 10.2 A, 56/10.3, 10.5, 341, 343, 432, 433, 436, 437, 451, 458, 464, DIG. 2, DIG. 7, DIG. 15; 701/50, 93, 110; 100/88, 89

(56) References Cited
U.S. PATENT DOCUMENTS

| | | | | |
|---|---|---|---|---|
| 4,034,543 A | * | 7/1977 | Voth et al. ...................... 56/341 |
| 4,376,298 A | * | 3/1983 | Sokol et al. .............. 56/10.2 R |
| 4,704,866 A | * | 11/1987 | Myers ......................... 180/306 |
| 4,893,241 A | * | 1/1990 | Girodat et al. ................. 701/50 |
| 5,551,218 A | * | 9/1996 | Henderson et al. ........... 100/88 |
| 5,752,374 A | * | 5/1998 | Allworden et al. ........... 56/341 |
| 5,768,872 A | * | 6/1998 | Von Allworden ........ 56/10.2 R |
| 5,913,801 A | * | 6/1999 | Bottinger et al. ........ 56/10.2 R |
| 6,050,074 A | * | 4/2000 | Clostemeyer ................. 100/88 |
| 6,073,426 A | * | 6/2000 | Mesmer et al. .......... 56/10.2 R |
| 6,148,255 A | * | 11/2000 | van der Lely ................ 701/50 |
| 6,315,658 B1 | * | 11/2001 | Weber ........................... 460/6 |
| 6,359,403 B1 | * | 3/2002 | Pollklas et al. .......... 56/10.2 R |

* cited by examiner

Primary Examiner—Thomas B. Will
Assistant Examiner—Nathan Mammen
(74) Attorney, Agent, or Firm—Larry W. Miller; John William Stader

(57) ABSTRACT

A method of controlling the combination of a baler and a tractor includes the steps of advancing the baler combination through a swath or windrow of biological crop matter with the tractor PTO operating at a generally constant speed to power the baler and the baler operating to take up biological matter while monitoring the flow rate of the biological matter through the baler. A microprocessor compares the assessed flow rate with an optimal flow rate and varies the travel speed of the tractor to maximize the flow rate of crop material through the baler. Preferably, the speed of operation of the tractor is accomplished through changing transmission speeds so that the PTO shaft speed is maintained at a substantially uniform rotational speed. The apparatus provided for carrying out the method of controlling the combination of a tractor and a baler increases the work rate of baling operations.

25 Claims, 14 Drawing Sheets

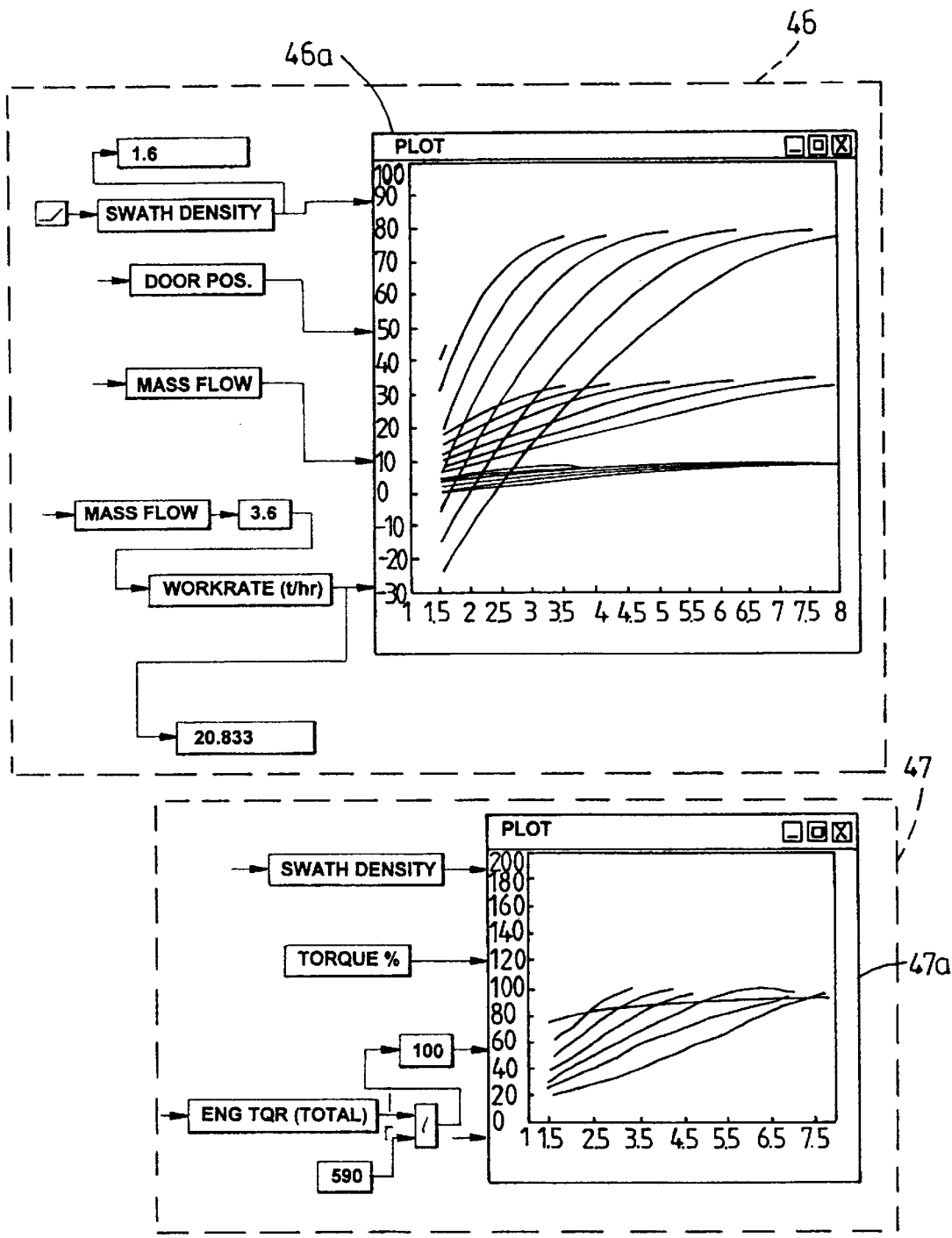
*Fig. 6* b

METHOD AND APPARATUS FOR CONTROLLING A TRACTOR/BALER COMBINATION

BACKGROUND OF THE INVENTION

The present invention relates to a method and apparatus for controlling an agricultural baling machine when combined with and connected to a tractor and, more particularly, to a method and apparatus for maximizing the work output of a baler by maximizing the flow rate of material through the baler.

In the field of agricultural vehicles it is well known to provide a baler, that is towable behind a tractor, to gather and form into bales biological matter left after a harvesting or mowing operation. "Biological matter" as used herein includes but is not limited to straw, grass, hay, forage and silage. "Tractor" as used herein includes any vehicle capable of propelling and providing power to a baler.

A baler is in use hitched to the tractor hitch and draws power from the tractor power take off (PTO) shaft, for the purposes of gathering and compacting biological matter. The biological matter typically lies in swaths or windows in a field. The baler gathers the biological matter, typically lying over a distance of several tens of meters, into an intake at the front of the baler. The baler compacts the biological matter into a bale of predetermined shape. The baler includes mechanisms for tying the bales with strong twine and knotting the twine; and then ejecting each completed bale, as it is formed, from the rear of the baler.

A development occurred in the baler art in the late 1970's. This was the introduction of so-called "large rectangular balers", or "large square balers". Some known large rectangular balers are capable of producing cubical bales each weighing a ton or more. This represented a significant increase, in baling capacity, over the previously available balers.

However it is becoming increasingly common for operators to use so-called "Midi" balers that typically produce bale masses in the range 250–750 kg. The invention is particularly but not exclusively suitable for use in such Midi-balers.

During use the pre-compression chamber forming part of a rectangular baler periodically transfers biological matter to a main baling chamber. A piston, in the baling chamber, that reciprocates under power from the tractor PTO shaft, compresses the biological material into a bale whose density is dictated by numerous factors including the volume of each charge from the pre-compression chamber.

Rectangular balers operate most efficiently when the swaths of biological material through which they are towed are of constant density. This ensures that the pre-compression chamber fills at a substantially constant rate. In practical use of large rectangular balers, however, the swath density is rarely constant over an entire field, or even from place to place in a swath. This can be for a number of reasons, including variations in crop density before harvesting; and variations in efficiency of the harvesting process leaving different amounts of biological material in different parts of the swaths. Such variations in the swaths often arise when, during harvesting, a harvesting machine (typically a combine harvester) has to slow down or stop part way along a row of crop. The variations also arise at junctions between swaths, in non-rectangular fields.

Heretofore, the operator of a tractor/baler combination has had to rely on visual inspection of the swaths as the tractor approached them, in order to judge the swath density. If the operator perceived a region of low swath density he would attempt to increase the tractor forward speed to try and temporarily increase the rate of intake of biological material into the pre-compression chamber, with the aim of maintaining a generally constant throughput of biological material through the baler.

Similarly if the operator noticed a region of high density in the swath he would attempt to reduce the tractor speed by an appropriate amount.

This method of regulating the throughput of biological material is inefficient for numerous reasons, including, at least:

a lack of consistency in the remedial action taken to overcome low and high swath densities;

the possibility of overloading the tractor engine when attempting to accelerate the tractor, e.g. as a result of performing transmission shifts that are not timed correctly and hence coincide with peak PTO shaft loadings. This can have an adverse effect on the engine loading and can in any event cause the tractor to slow or stop, thereby affecting work rate;

failure to notice or respond adequately to high swath densities leading to blockages, in the pre-compression chamber, that require halting of the baling operation to clear; and the tractor operator taking remedial action for too long or too short a period.

In sloping fields the above-noted problems are frequently more acute than in flat fields.

In general it is desirable to maximize work rate during baling operations. One reason for this is that the moisture content of the biological material frequently affects its specific mass, quality and value. It is likely that delays and inefficiencies in baling operations will allow unacceptable moisture content changes, especially in countries, such as those in Northern Europe, whose climates are variable at most times of year.

The prior art discloses several attempts at improving the consistency of the charge supplied from the pre-compression chamber to the baling chamber.

In GB-A-1.575.243 and U.S. Pat. No. 4,034,543 mechanisms temporarily halt both the baling plunger and the stuffer fork that supplies charges of biological material from the pre-compression chamber, when a mass sensor detects underloading of the said chamber.

However, U.S. Pat. No. 4,135,444 notes that the technique of GB-A-1.575.243 and U.S. Pat. No. 4,034,543 is sub-optimal because the need to accelerate and decelerate the massive plunger leads to failure of mechanical components, such as clutches, in the baler.

U.S. Pat. No. 4,135,444 proposes temporary halting of only the stuffer forks, while the plunger continues to reciprocate, until the charge in the pre-compression chamber is adequate. However there is no disclosure in U.S. Pat. No. 4,135,444 of how to accommodate swaths of high density, that lead to overloading of the pre-compression chamber and/or the tractor engine.

Also, none of the aforementioned documents discloses an apparatus or method whose aim is to maximize the overall work rate of the tractor/baler combination; nor does any of them disclose a method or apparatus that may compensate for the effects of field slope on baler throughput.

SUMMARY OF THE INVENTION

It is an object of the present invention to overcome the aforementioned disadvantages of the prior art by providing a method and apparatus for controlling the operation of a baler by monitoring the flow rate of the baler and adjusting the speed of the tractor towing the baler to optimize the crop throughput.

It is an feature of this invention to comparing the assessed flow rate against an optimal flow rate, and adjusting the tractor speed in dependence on the outcome of the comparison.

It is an advantage of this invention that the tractor speed is changed only when necessary, as determined by the assessed flow rate of biological material.

It is another object of this invention to adjust the flow rate of the baler by adjusting the tractor forward speed, both when the flow rate of material through the baler is too high and when the flow rate is too low.

It is another feature of this invention that the method of controlling the tractor/baler combination optimizes flow rate and prevents blocking of the pre-compression chamber.

It is still another object of this invention to repeat the method steps cyclically in dependence on the pulses of the clock of a microprocessor arranged to carry out the method.

It is still another feature of this invention that the correction effected by adjustment of the vehicle speed may take effect only for the duration of the sub-optimal flow rate through the baler.

It is yet another object of this invention to use transmission shifts to change the speed of the tractor thereby allowing the tractor engine to run at constant speed.

It is still another advantage of this invention that the PTO shaft speed of the tractor does not vary significantly while the speed change takes place.

It is yet another advantage of this invention that the use of transmission shifts permits a method that minimizes the risk of overloading or over-revving the tractor engine.

It is yet another feature of this invention to allow minor variations in the flow rate of biological material through the baler without the need for the tractor transmission ratio to shift incessantly.

It is another object of this invention to modify the speed of travel of the tractor by monitoring defined variables in the biological material passing into and through the baler.

It is still another feature of this invention that the tractor engine load is compared to a limit value before incrementing the transmission.

It is a further advantage of this invention that the method of controlling the tractor prevents engine overloads on ratio change-up.

It is yet another feature of this invention that the slope of the ground is taken into consideration in changing the operational speed of the tractor.

It is a further object of this invention to use a reference model through the use of a microprocessor to carry out the prediction.

It is a further feature of this invention that the reference model has stored therein one or more lookup tables in a memory forming part of or operatively connected to the microprocessor.

It is still a further feature of this invention that a flywheel torque sensor is used to define the load on the tractor engine.

It is yet a further feature of this invention to predict the load on the tractor engine a plurality of times thus eliminating misleading instantaneous loadings that may otherwise cause unnecessary transmission shifts.

It is still another feature of this invention to decrement the transmission ratio more rapidly that incremental changes to avoid extreme forms of tractor engine overload that can cause plugging of the pre-compression chamber and/or shearing of a shear bolt, commonly present in balers, to protect the drive train for the stuffer forks.

It is yet a further object of this invention to increment and decrement the transmission ratios when the reciprocably moveable baler plunger occupies a predetermined position.

It is yet a further feature of this invention that the predetermined plunger position is chosen to avoid superimposing the torque loading arising from the gear change onto the peak loading from the plunger cycle.

It is still another feature of this invention to allow the signals processed by the microprocessor to be substantially or entirely independent of the bale density.

It is another advantage of this invention to sample the sensor door position when the baler plunger is between approximately 100° and 150° from its front dead center position.

It is still another advantage of this invention to measure the flow rate of the baler by detecting the PTO shaft torque.

It is a further advantage of this invention to sample the PTO shaft torque the baler plunger is between about 350° and 50° from its front dead center position.

These and other objects, features and advantages are accomplished according to the instant invention by providing a method of controlling the combination of a baler and a tractor including the steps of advancing the baler combination through a swath or windrow of biological crop matter with the tractor PTO operating at a generally constant speed to power the baler and the baler operating to take up biological matter while monitoring the flow rate of the biological matter through the baler. A microprocessor compares the assessed flow rate with an optimal flow rate and varies the travel speed of the tractor to maximize the flow rate of crop material through the baler. Preferably, the speed of operation of the tractor is accomplished through changing transmission speeds so that the PTO shaft speed is maintained at a substantially uniform rotational speed. The apparatus provided for carrying out the method of controlling the combination of a tractor and a baler increases the work rate of baling operations.

BRIEF DESCRIPTION OF THE DRAWINGS

The advantages of this invention will become apparent upon consideration of the following detailed disclosure of the invention, especially when taken in conjunction with the accompanying drawings, wherein:

FIGS. 6a and 6b constitute a functional block diagram of a steady state reference model forming part of the apparatus, and used in the method, of the invention;

DETAILED DESCRIPTION OF THE PREFERRED EMBODIMENTS

Figure 1A:
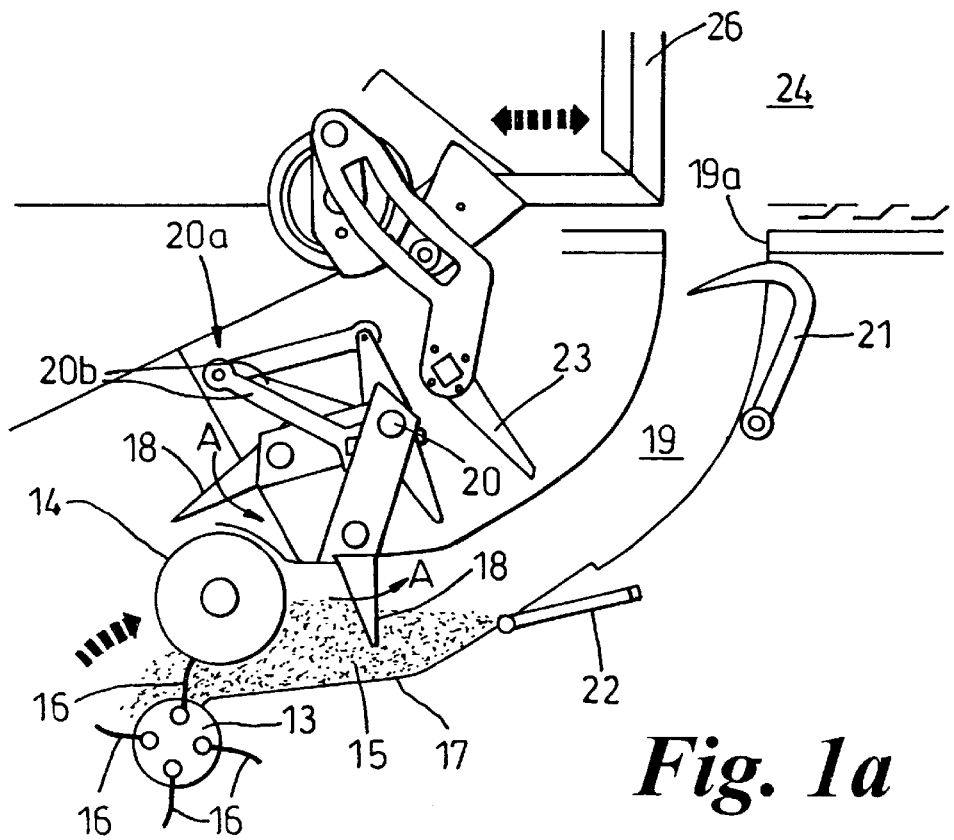
FIGS. 1a–1d are schematic, side elevational views showing the operating principles of a per se known, large rectangular baler including a plurality of packer forks for charging the pre-compressing chamber.
Figure 1B:
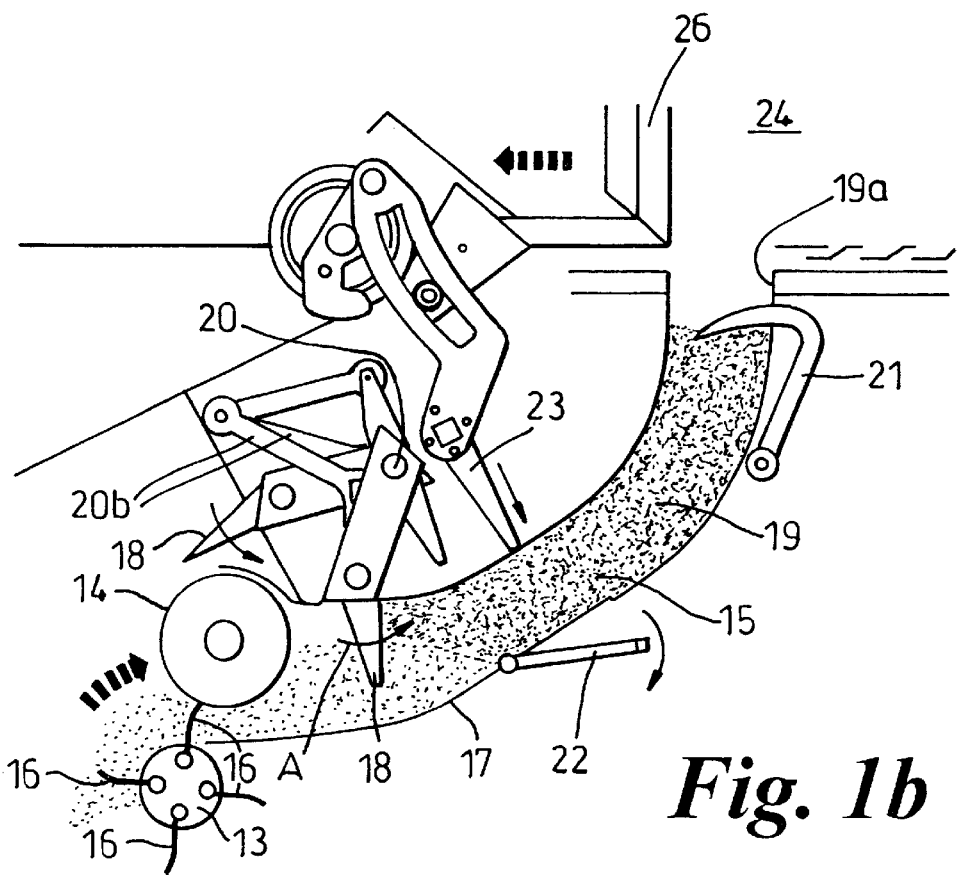

FIGS. 1*a*–1*b* show the operation of a per se known baler 10 (FIG. 3) that may be towed behind a tractor 11 (FIG. 3) as part of a tractor/baler combination. Towing of the baler 10 along a swath 12 of biological matter 15 causes its advancement such that the baler 10 takes up the biological matter 15. This is achieved by the combined actions of a continuously rotating pick up bar 13 and continuously rotating auger 14. Pick up bar 13 includes a series of tines 16 that gather the biological matter 15 towards auger 14. The screws of auger 14 are arranged to drive the biological matter 15 to the lateral mid-point of the baler intake area, and from there into a chute 17.

The intake area of baler 10 may also optionally include a series of knife blades that are switchably operable to cut the pieces of biological matter to a predetermined size. It has been found through experimentation that the operation of the knife blades makes little appreciable difference to the mass flow rate of biological matter 15 through the baler.

In chute 17 a series of packer forks 18 are driven by a drive shaft 20 to reciprocate continuously, by means of a four bar linkage arrangement indicated by numeral 20*a*, as indicated by the arrows A in FIG. 1*a*. The packer forks 18 pack biological matter 15 into a pre-compression chamber 19. Four bar chain 20*a* includes a pair of conrods 20*b* that drive the packer forks 18. A series of haydogs 21 are initially in an advanced position inserted into the upper end of pre-compression chamber 19 as shown in FIGS. 1*a* and 1*b*. The haydogs 21 prevent the biological matter 15 from advancing beyond the open end 19*a* of pre-compression chamber 19. Consequently the combined action of the packer forks, during the period depicted in FIGS. 1*a* and 1*b*, fills the pre-compression chamber with biological matter 15.

Figure 1C:
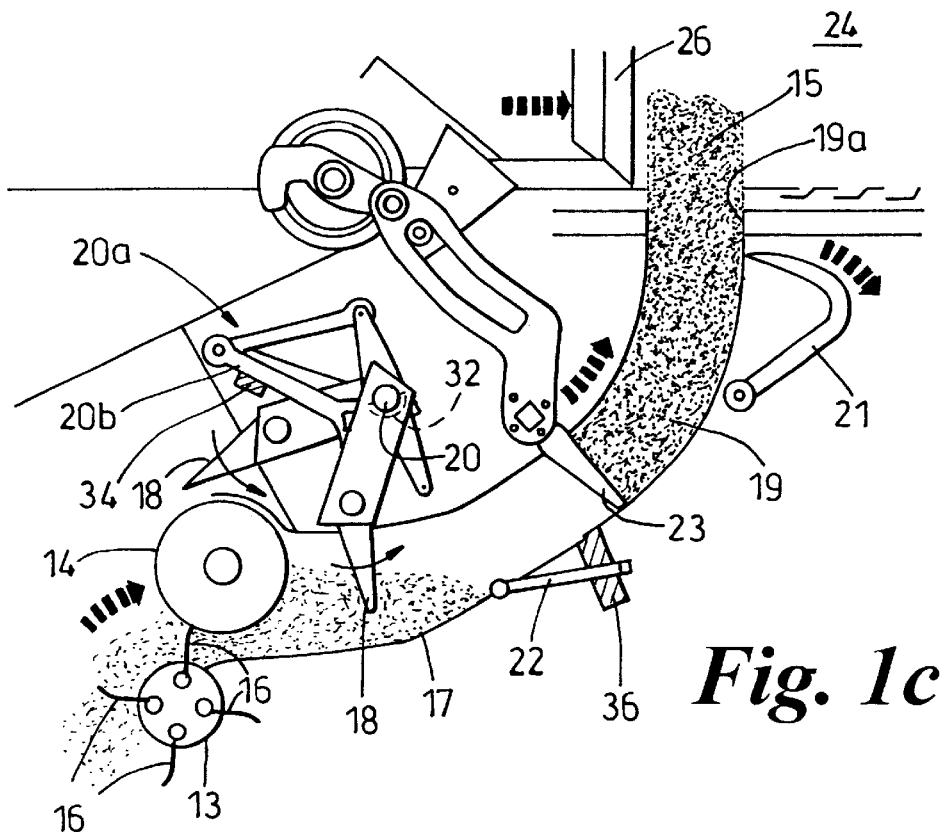
Figure 1D:
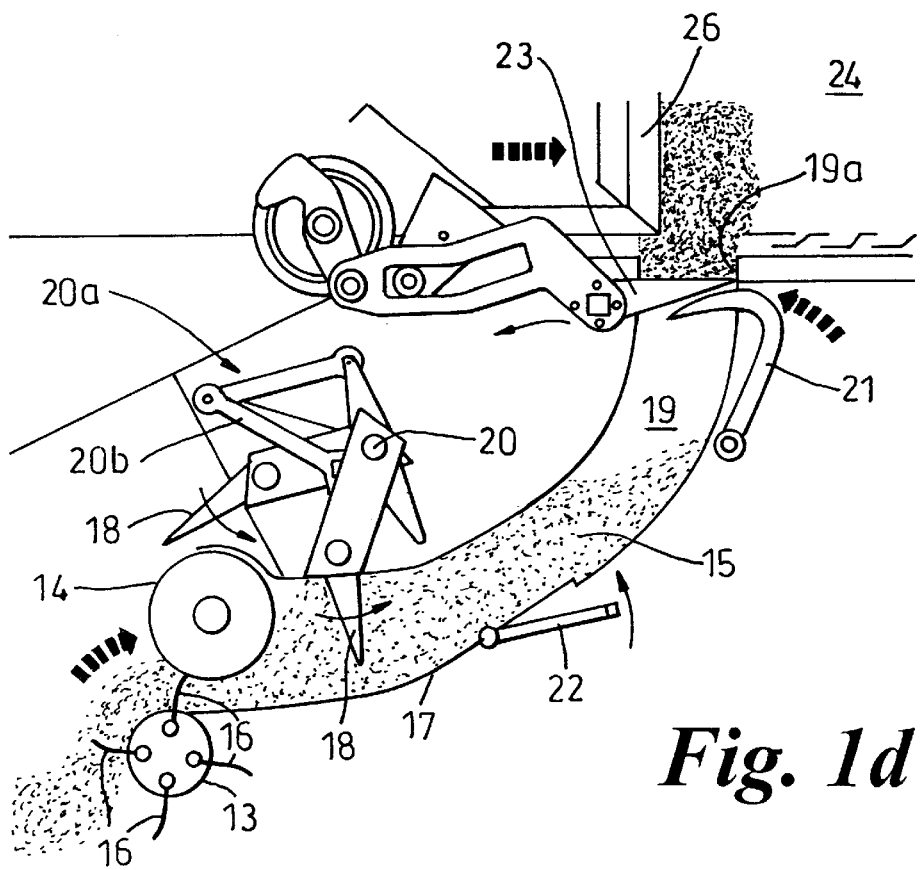
Figure 2:
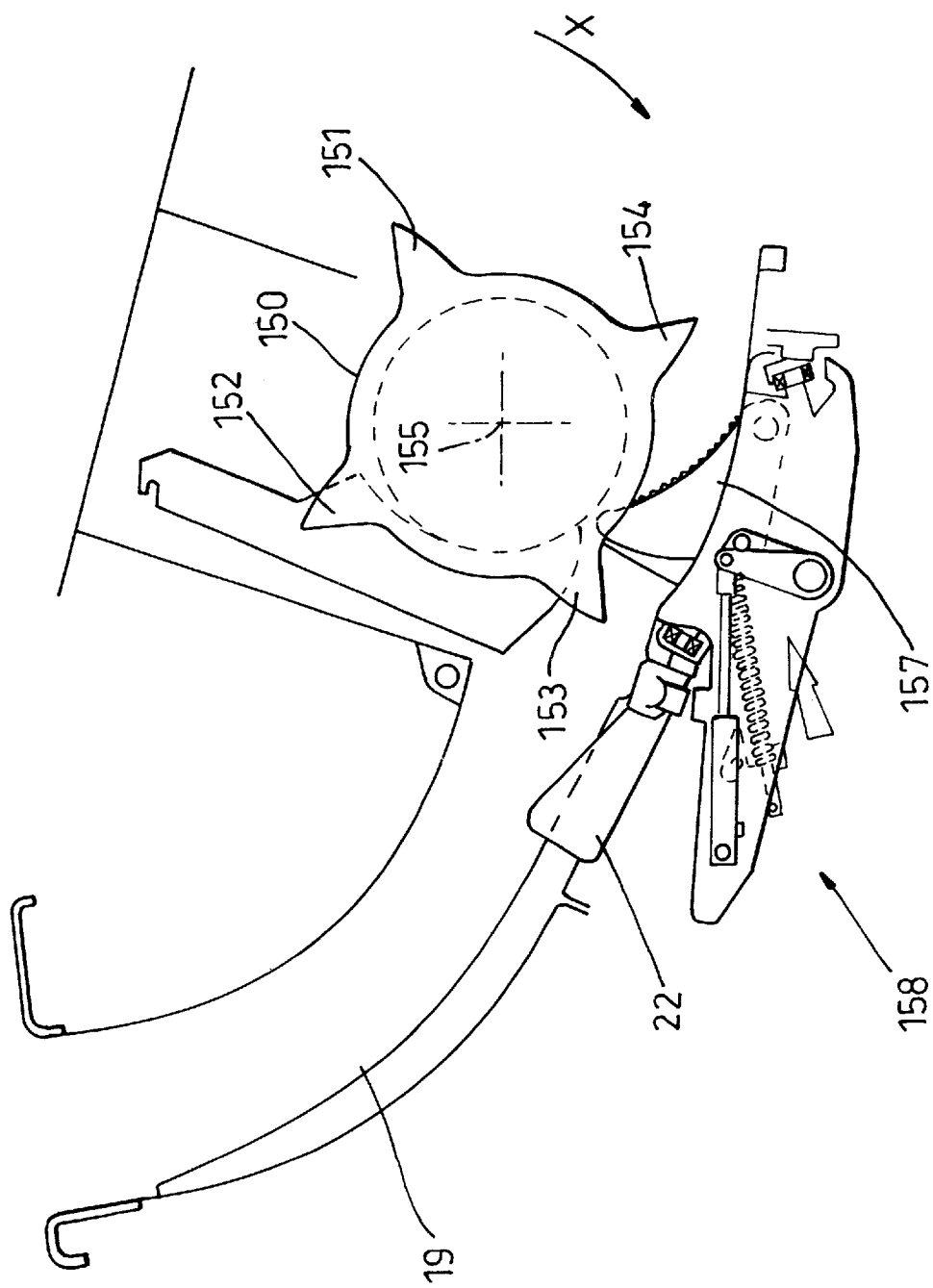
FIG. 2 shows the operating principles of another per se known baler having a rotary feeder mechanism in conjunction with a series of cutter knives.

As an alternative to the packer forks 18 driven by a four bar linkage, some balers employ a rotary feeder mechanism as shown in FIG. 2, depicting a view from the opposite side of a baler to that of FIGS. 1*a*–1*d*.

The packer forks 18 and four bar mechanism 20*a* are absent from the FIG. 2 arrangement. The function of these components is carried out by a rotatable cylinder 150 having disposed extending along its outer surface, at four locations that are equi-spaced from one another, four series of feeder tines 151–154. In practice the tines 151–154 extend as four angularly spaced helices.

Cylinder 150 is rotatably supported on a shaft shown schematically by axis 155 extending transversely across the intake to pre-compression chamber 19. Thus rotation of cylinder 150, as a result of per se known connection to a powered, rotatable drive shaft, in the direction of arrow X, causes feeding of biological material into pre-compression chamber 19.

The operation of cylinder 150 is broadly similar to that of packer forks 18, but cylinder 150 gives rise to a more steady throughput that causes less pronounced peaks in the tractor power take off requirement.

When the tine helices are defined by a series of laminae extending longitudinally along cylinder 150 the tines 151–154 may be rotationally interdigitated with a series of knives one (157) of which is visible in FIG. 2. The knives function to crop pieces of the biological material to a predetermined length. Optionally the knives are retractable from the intake, under control of a retraction mechanism 158 that is known per se. The haydogs 21 are omitted from FIG. 2 for purposes of clarity. One skilled in the art will recognize that the haydogs 21 would normally be present.

The pre-compression chamber 19 includes in its lower wall, near the packer forks 18 or rotary feeder, a sensor door 22. Sensor door 22 is spring biased to a closed position flush with or protruding into the lower wall of pre-compression chamber 19, but when the mass of biological matter 15 exceeds the biasing force maintaining the sensor door 22 closed, sensor door 22 opens as shown in FIG. 1*b* to trigger the next phase of operation of the baler 10, as shown in FIGS. 1*c* and 1*d*.

The biasing force acting on sensor door 22 is equivalent to the mass of a predetermined charge of biological matter 15 in pre-compression chamber 19. In some balers the biasing force is adjustable, to take account of variations e.g. in crop type and moisture content.

Following opening of the sensor door 22 the haydogs 21 are withdrawn from the pre-compression chamber 19. Simultaneously a series of stuffer forks 23 enter the pre-compression chamber 19 to drive the charge of biological matter 15 out of upper, open end 19*a* of pre-compression chamber 19 and into a baling chamber 24. These operations are denoted by dotted arrows in FIG. 1*c*. The stuffer forks 23 are also omitted from FIG. 2 for reasons of clarity, but would normally be present.

A massive plunger 26 reciprocates continuously (e.g. at 42 cycles per minute) along the length of baling chamber 24, to compact each charge of biological matter therein. Each cycle of operation of the components in the pre-compression chamber 19 results in the compaction of a charge that is a proportion of the mass of a completed bale. At the end of the baling chamber remote from the components shown in FIGS. 1*a*–1*d*, various sensors detect the completion of a bale and activate a tying and knotting mechanism that ties the bale with twine, before ejecting the completed bale from the rear of baler 10.

During this process, as illustrated in FIG. 1*d*, the stuffer forks 23 withdraw from the upper end of pre-compression chamber 19; the haydogs 21 are reinserted into the pre-compression chamber 19; and the sensor door 22 is reset to its closed position to permit accumulation of a further charge of biological material.

The operation of the stuffer forks 23 is timed with reciprocation of the plunger 26 since for much of its reciprocation the underside of plunger 26 closes the open end 19*a* of chamber 19. Clearly the stuffer forks 23 can only feed a charge into baling chamber 24 when the plunger 26 is at the extreme left hand end of its travel as shown in FIG. 1.

Figure 3:
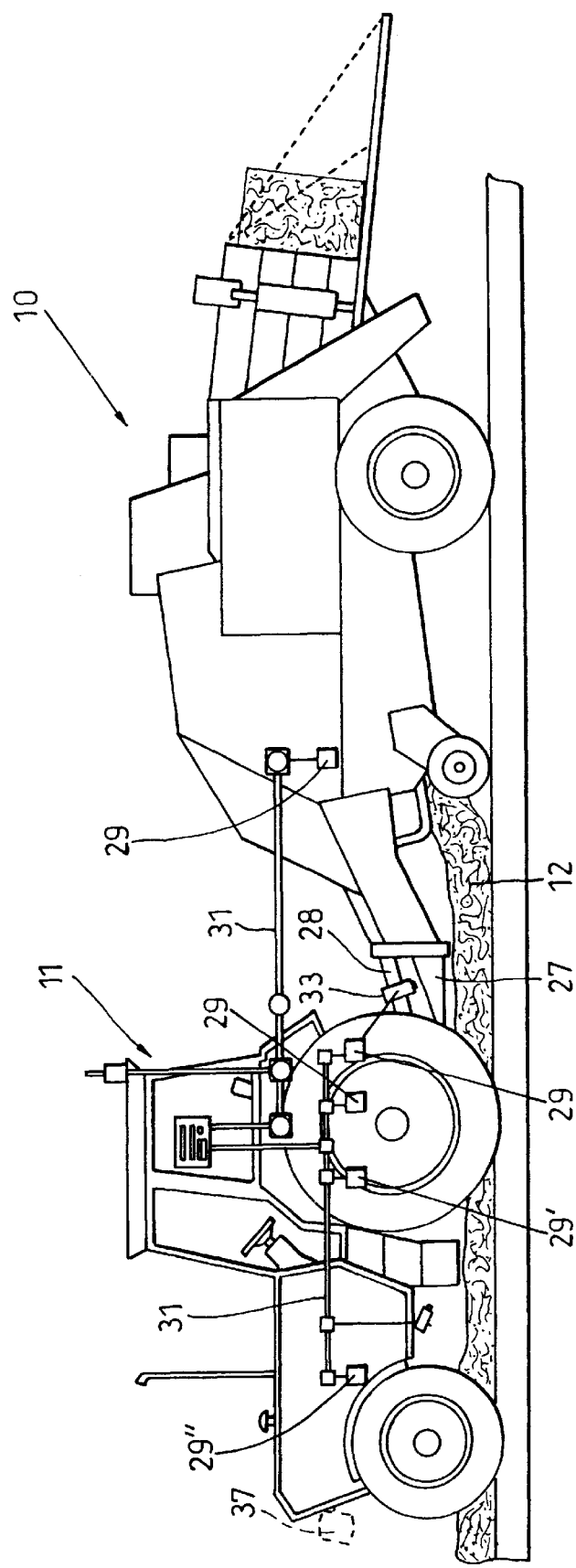
FIG. 3 is a schematic, side elevational view of a tractor/baler combination according to the invention.

Referring now to FIG. 3, a tractor/baler combination according to the invention includes a tractor 11 towing a baler 10 whose operation is essentially as shown in FIGS. 1*a*–1*d* or as modified by the FIG. 2 arrangement. Baler 10 is attached by means of a drawbar 27 to the hitch of the tractor. PTO shaft 28 of tractor 11 rotates at constant speed to power the baler 10.

Tractor 11 and baler 10 include a series of electronic processors in the form of microprocessors 29 that are, in the embodiment shown, connected to one another by means of a CAN-BUS 31 or any equivalent means of electronic communication.

The microprocessors 29 are in the FIG. 3 embodiment present in part to constitute a vehicle control apparatus of the kind disclosed in EP-A-0 838 141. Clearly the functions of the control apparatus of EP-A-0 838 141, while highly desirable, are not essential for carrying out the invention disclosed herein. Consequently it is possible to devise working embodiments of the invention having more or fewer microprocessors 29 than those shown in FIG. 3. Regardless of the microprocessor arrangement, embodiments of the invention include automatic control of the tractor engine speed and power output, preferably by means of one of the microprocessors 29.

Also regardless of the precise microprocessor arrangement, the tractor/baler combination of FIG. 3 includes sensors detecting one or more of the torque in baler packer driveshaft 20; the torque in tractor PTO shaft 28; the force exerted by one or more of the baler packer fork conrod 20b; and the position of sensor door 22.

When the baler is of the type that includes a rotary feeder assembly, such as that exemplified by FIG. 2, the packer conrod force would not be measured. Instead the rotary feeder driveshaft torque is useable to provide an indication of the loading deriving from the packing/feeding operation. Each of the above-noted variables has been found to correlate with the flow rate of biological material through the pre-compression chamber 19.

Use of the sensor door position is particularly advantageous in the FIG. 1 baler because, if measured at a predetermined point in the plunger cycle, the said door position is effectively a direct measure of the pre-compression chamber refill rate, that is the flow rate of biological material through the baler.

The measured flow rate signal obtained from the sensor door position is independent of the bale density (that varies automatically in some balers). Consequently the sensor door position parameter is comparatively straightforward to employ, requiring a simple position sensor such as an LVDT, and a minimal amount of processing that is concerned primarily with co-ordinating the sampling times with the plunger position. As an alternative to an LVDT a rotational potentiometer is useable. Other sensors that are equivalent to an LVDT or rotary potentiometer are also within the scope of the invention.

In contrast, the PTO torque value varies significantly in dependence on the bale density, at some points in the plunger cycle. However at other points in the plunger cycle the PTO shaft torque is substantially independent of bale density but nonetheless indicative of flow rate of biological material. Use of the PTO shaft torque as a control parameter therefore also requires a timing operation related to the plunger position.

When using the PTO shaft torque as a parameter one has the choice whether to locate the transducer on the baler or on the tractor that tows the baler.

Clearly when the torque transducer is located on the tractor it is necessary to transmit data on the plunger position from the baler to the tractor in order to time the sampling of the torque measurements correctly. Two exemplary ways, within the scope of the invention, of achieving such data transfer are via:

a hard wired connection between the CAN-BUS of the baler and the tractor CAN-BUS; or a transmitter-receiver combination that replicates such a connection.

In either case there is a need for transfer of data between two distinct CAN-BUS nodes. This can cause problems connected with the speed of data transfer. Also, a vehicle CAN-BUS has a limited maximum message density.

It follows from the foregoing considerations that, while it is possible within the scope of the invention to sample over a comparatively short period (such as 10° of plunger movement), it is desirable to sample over longer periods (such as 50° or 60°).

The advantage of such longer sampling periods are that it is easier to confirm that any given message relates to a particular sampling period and that the loss of data packets that may occur at the beginning or end of a message, as a result of the aforementioned transmission problems, assumes a lesser significance when the sampling period is longer than when it is shorter.

When the tractor-baler combination includes a transmitter/receiver combination there may be a need to provide additional processing power to ensure coding of data from the baler and eliminate the effects of transmission delays etc.

The relationship between sensor door position and flow rate is a quadratic equation; whereas the relationship between PTO shaft torque and flow rate is linear. Thus the signal processing of the PTO shaft torque data is perhaps slightly preferable as being simpler to carry out than that of the door position data.

In the rotor cutter type of baler shown in FIG. 2 there is a tendency for the tines 151–154 to throw some of the biological material to the rear of the pre-compression chamber, beyond the sensor door 22. Therefore in a rotor cutter baler it is preferable to detect one of the other measurable variables, specified herein, as an indicator of the flow rate of biological matter, instead of the sensor door position.

Figure 11:
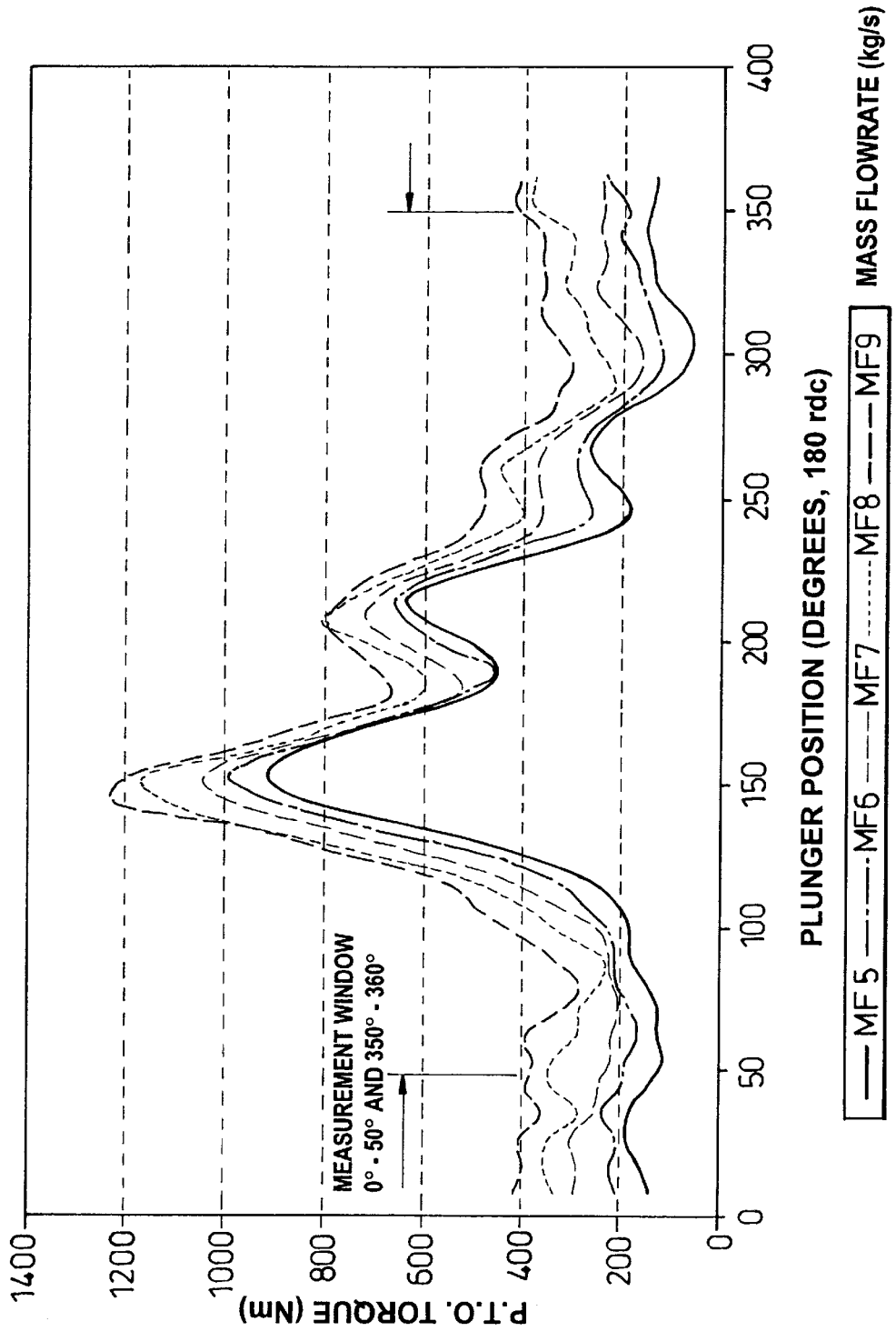
FIG. 11 is a plot of PTO shaft torque against plunger position in a rotor cutter baler.
Figure 12:
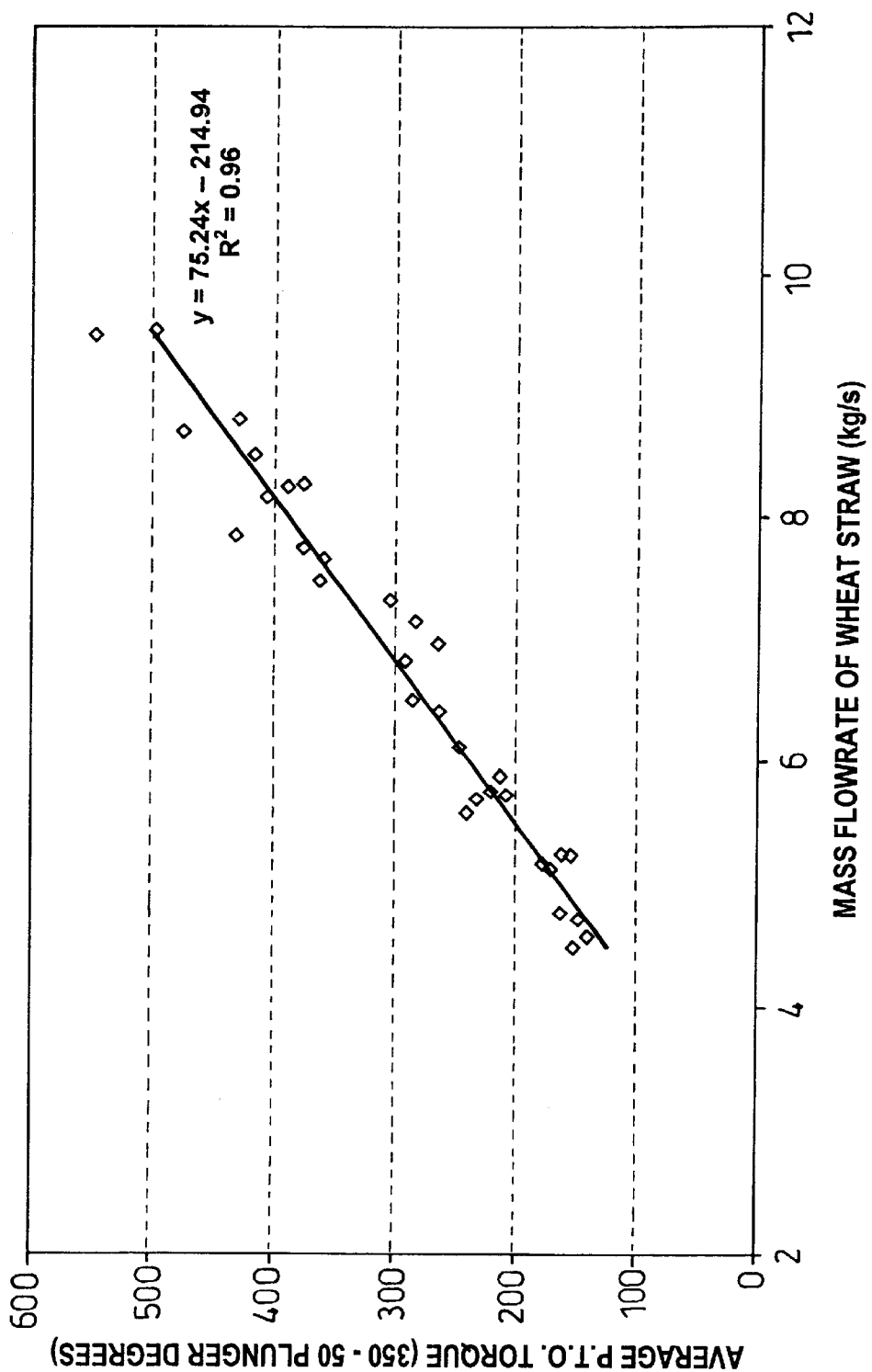
FIG. 12 shows the relationship between PTO shaft torque, measured over part of the plunger cycle shown in FIG. 11, and the mass flow rate of straw in the baler.

The PTO shaft torque measured by sensor 33 described below is suitable for this purpose. The detected value of PTO shaft torque is substantially independent of bale density, when the plunger door is between approximately 350° and 50° from its fdc position as illustrated by FIG. 11. As FIG. 12 shows, there is a simple linear relationship between the average PTO shaft torque value and the mass flow rate of straw in the mentioned portion of the baler plunger cycle. Consequently assessment of the flow rate of biological material is straightforward and reliable.

The packer shaft torque and packer conrod force values are also linearly related to the flow rate value, regardless of the type of pre-compression chamber.

In the embodiment shown the baler packer driveshaft torque may be detected using a torque sensor in the form of a strain gauge forming part of a bridge circuit, and being operatively connected to a telemetry unit or via slip rings if so desired. These components are represented schematically by numeral 32 in FIG. 1c, and are known per se.

The PTO shaft torque may be detected e.g. using a per se known torque sensor 33 shown schematically in FIG. 3. When necessary the rotor feeder shaft torque could be detected using an analogous arrangement. Sensor 33 is shown connected to microprocessor 29 by a schematic line that in a practical embodiment of the invention would be differently located.

The packer fork conrod force maybe measured by means of a further strain gauge 34 forming part of a bridge circuit, operatively connectable to one or more of the microprocessors 29. The sensor door position may be measured by means of a linear variable differential transformer (LVDT, rotary potentiometer or other, equivalent device) 36 shown schematically in FIG. 1c.

In a practical embodiment of the invention, while sensor 33 is always present, only one of the sensors 32, 34 and 36 need be present. Sensor 36 is the simplest, cheapest and most convenient. The sensors 32, 33, 34 and 36 may each take a form other than the exemplary form described. Such variations are within the scope of the invention.

The baler 10 includes a proximity sensor (not visible in the drawings but of per se known design) for detecting the true position of the baler plunger crank, and hence the actual plunger position. From such data it is possible to determine inter alia the time when the peak PTO torque occurs, since this happens in the same region of each plunger cycle. From such data it is possible to time the transmission shifts (when these are needed) so as to avoid overloading the tractor engine. This is true even when (as discussed hereinbelow) data sampling occurs at a time in the plunger cycle other than that corresponding to the PTO peak torque.

Typically each single-ratio shift of a powershift transmission as commonly used in modern tractors takes approximately 0.5 seconds. A shift over several ratios (such as from ratio B6 to ratio B1) and certain single-ratio shifts might take up to 1 second.

In a baler in which each plunger cycle lasts approximately 1.5 seconds there will always be sufficient time to effect the necessary transmission shifts without adding to the peak torque demand.

In practical embodiments of the invention the proximity sensor would be used in conjunction with a rotary shaft encoder whose function is to resolve the position of the plunger crank relative to the known position in each cycle detected by the proximity sensor.

The tractor 11 includes a sensor detecting the transmission ratio of the tractor transmission. In the embodiment shown the sensor may include one or more transducers operatively connected to a transmission controlling microprocessor 29', but in embodiments lacking microprocessor 29' another arrangement may exist. For example the transmission ratio transducer output(s) may feed directly to a single control processor.

Optionally the tractor 11 also includes a sensor detecting the engine torque. When present this sensor may be e.g. a flywheel torque sensor as disclosed in U.S. Pat. No. 5,596,153.

The microprocessor(s) 29 is/are programmed to implement a method described hereinbelow. The microprocessor(s) 29 is/are operatively connected to a memory having stored therein for comparison purposes:

One or more of the following optimal values of the mass flow rate of biological material flowing through the pre-compression chamber 19 can be measured or sensed, including:

the predetermined amounts referred to hereinbelow;
the predetermined maxima referred to hereinbelow; and
data representative of a predetermined position of the baler plunger.

As indicated, the rotor cutter type of baler, whose pre-compression chamber is exemplified by FIG. 2, includes a cassette of retractable knives that are activated to cut non-straw products.

Engagement of the knives in this way affects the flow of biological material through the baler. Therefore it is desirable to provide compensation for the effects of the knives when carrying out the method of the invention.

This is readily achievable through use of subroutines that add one or more correction factors, indicative of the number of knife blades engaged for use, to the assessed flow rate of biological material. The subroutines may in use of the apparatus be called e.g. by the setting of a microswitch or proximity sensor indicative of knife engagement; or eg. an operator input made via a cab mounted interface device such as a touch screen or push button.

Figure 4:
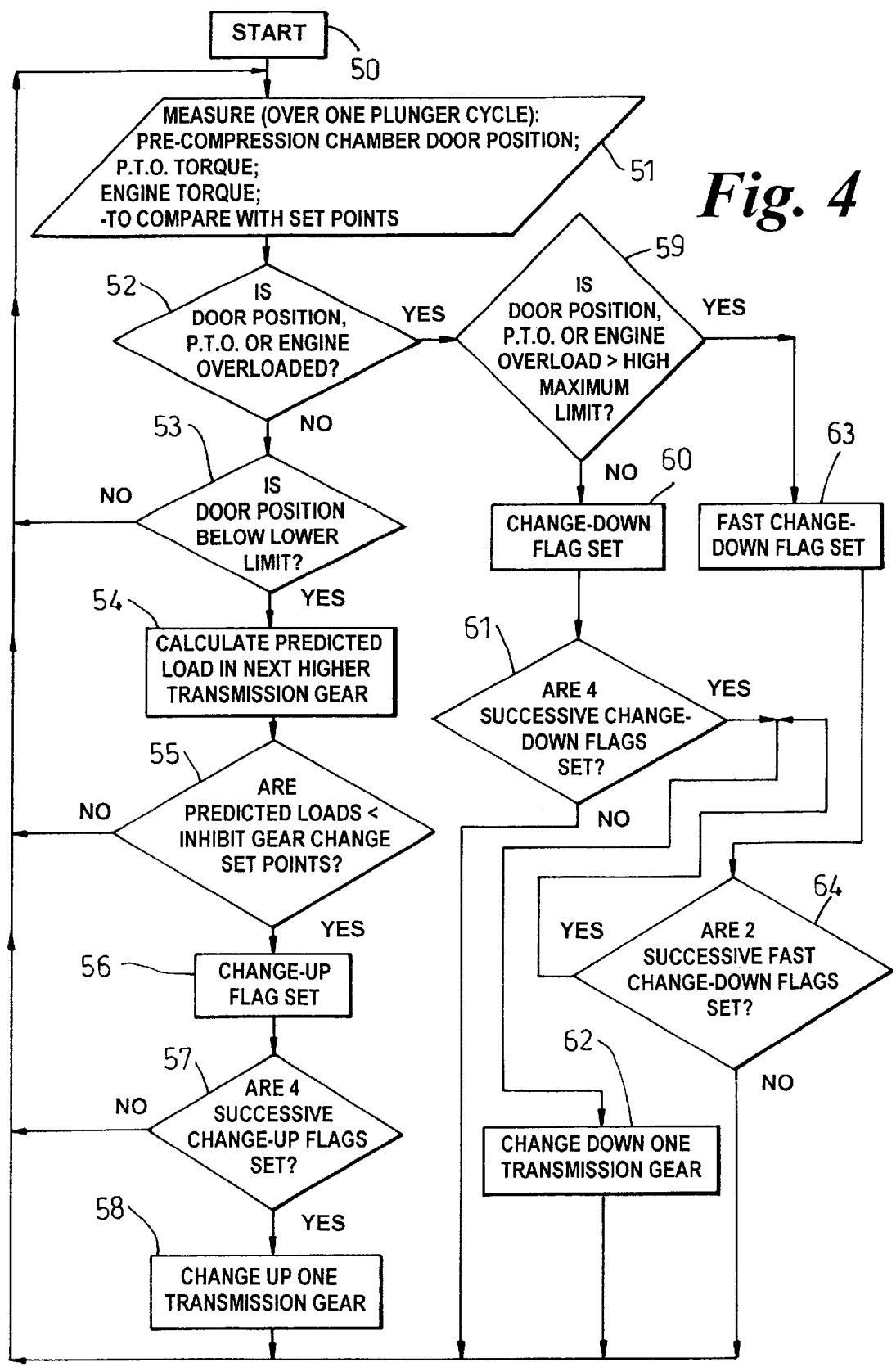
FIG. 4 is a flow chart summarizing the steps of a method according to the invention.

The following description of use of the apparatus of the invention, in accordance with the method of the invention, makes reference primarily to the flow diagram of FIG. 4. In the following description reference is made to assessment of the flow rate of biological material by measurement of the position of sensor door 22 at certain points in the plunger cycle using LVDT (or rotary potentiometer or similar device) 36. This is because experiments indicate a close correlation, at certain points in the plunger cycle, between the sensor door position and the mass flow rate. However, as indicated above, any of the packer driveshaft torque, the rotary feeder driveshaft torque, the PTO torque and the packer fork conrod force may equally well be used for this purpose, and terms descriptive of such data may be substituted into the following description in place of references to the sensor door position.

In use of the apparatus of the invention the tractor/baler combination 11/10 commences advancing (step 50 of FIG. 4) along a swath 12 of biological material 15. The swath may be of inhomogeneous density. During this action the tractor PTO shaft 28 rotates at constant speed. In practice this is achieved through one of the microprocessors 29" controlling the governor of the tractor engine in a per se known manner.

The baler 10 takes up biological material 15 as described herein in relation to FIGS. 1a–1d and 2, while the tractor/baler combination advances. During operation of the combination 11/10, control software programmed in the microprocessor(s) 29 assesses the mass flow rate of biological material 15 through the baler (steps 51–53).

At the same time the software preferably also measures (at step 51) the PTO torque and, when an appropriate sensor is present, the engine torque.

The assessed mass flow rate value (step 51) is compared against an optimal flow rate, by assessing initially whether (step 52) the sensor door position is overloaded (i.e. it exceeds a predetermined maximum position value, represented e.g. by a particular voltage level in the signal from LVDT or similar device 36).

If the result of the comparison at step 52 indicates overload of the sensor door position the control logic passes to step 59 that is concerned with decrementing the tractor transmission ratio; whereas if the comparison at step 52 indicates no overload of the sensor door position the control logic passes to step 53, that initiates an assessment of whether to increment the transmission ratio.

Thus, regardless of the outcome of the comparison at step 52, the method includes the step of changing the speed of advancement of the combination 11/10 (by changing the transmission ratio) and hence, since more or less biological matter 15 per unit time will enter the baler as a result, changing the mass flow rate of biological material through the baler.

Step 53 therefore is a comparison of whether the assessed (actual) mass flow rate, determined from the LVDT signal, is less than the stored, optimal flow rate by more than a first, predetermined amount.

At step 53 if the LVDT signal indicates the sensor door 22 position value to be less than its limit position, as stored in the memory device, corresponding to underloading of the pre-compression chamber 19, the microprocessor 29 predicts (step 54) what would be the engine loading were the software to increment the transmission ratio by one ratio step.

The software then assesses, at step 55, whether the thus predicted load exceeds a predetermined value referred to as a "gear change set point". The point of steps 54 and 55 is to maintain the work rate of the baler, as determined from the position of sensor door 22, at greater than a predetermined minimum without causing overloading of the tractor engine.

The comparison at step 55 takes place with respect to data, that may be obtained through experimentation, that are stored in a memory (e.g. ROM) operatively connected to the microprocessor 29.

Figure 5:
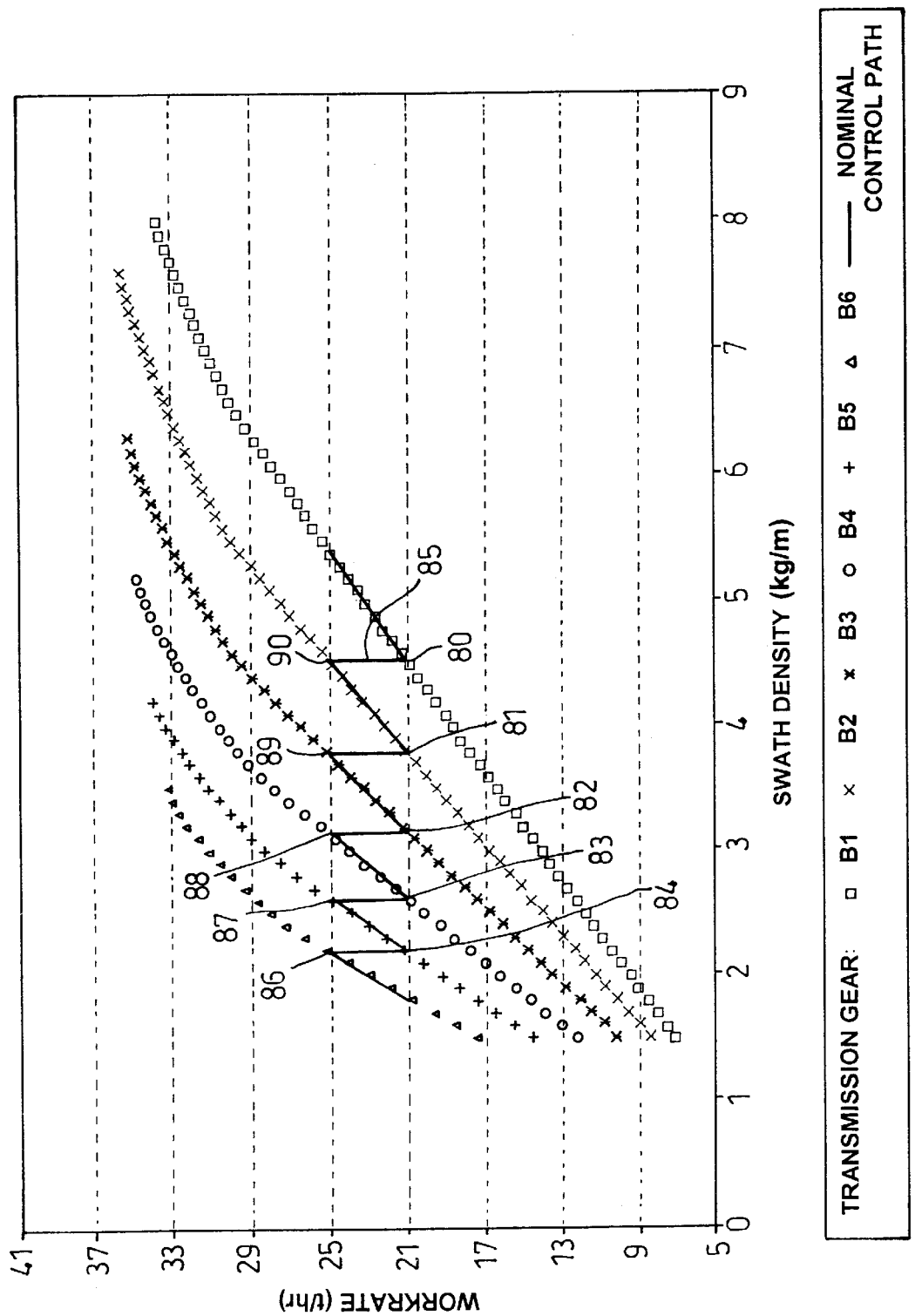
FIG. 5 is a graph of baler work rate vs. swath density, in respect of a tractor/baler combination according to the invention.

FIG. 5 is one way of showing these data in graphical form. FIG. 5 is a series of plots of baler work rate against swath density for each of six tractor transmission ratios measured when the tractor 11 of the combination of the invention travels on level ground. Of course tractors usually possess many more than six transmission ratios, but only a limited number, such as the six plotted, is likely to be suitable for baling operations.

The solid line 85 superimposed on the plots of FIG. 5 represents the effect of the software program. Taking for example the plot for transmission ratio B1 (the lowest ratio tested), it is theoretically possible to operate at swath densities as low as 1.5 kg/m but the work rate then drops to 5.5 tons/hour, an unacceptably low level. Consequently the solid line 85 represents a software-imposed requirement to increment to ratio B2 when the swath density (as assessed by the mass flow rate) falls to about 4.5 kg/m, corresponding to "gear change set point" 80 in FIG. 5. When this point is reached the transmission ratio increments to ratio B2, with the result that work rate instantaneously rises, as illustrated by line 85, to 25 t/hr, corresponding to the work rate in ratio B2 at a swath density of 3.5 kg/m and a predetermined tractor engine speed suitable for providing the correct PTO shaft speed for baler 10.

Similar considerations apply to subsequent "gear change set points" 81–84 corresponding to changes up respectively to ratios B3–B6. Thus in one baler the method ensures a work rate of between 21 and 25 t/hr, by (as necessary) incrementing and decrementing the transmission ratio each time the swath density would otherwise drop below 21 t/hr or rise above 25 t/hr unless the prediction algorithm (step 52) indicates that a transmission shift would be likely to overload the tractor engine. Obviously different tractor/baler combinations can be configured to operate between different upper and lower work rate limits if desired. The work rate limits are also influenced by the prevailing field conditions.

The graph of FIG. 5, that preferably is specific to the tractor/baler combination 11/10 under consideration, may be stored in ROM (e.g. a CD-ROM) readable by the microprocessor(s) 29. The tractor 11 and/or the baler 10 may for this purpose include or have operatively connected thereto a disc reader. The graph of FIG. 5 may be in the form of a lookup table.

If the result of the comparison at step 55 is that the transmission ratio should increment, a flag (e.g. a bit of data) is set at step 56 indicating the need for a change up. The software then loops and carries out steps 51–55 again, so that the step of predicting the tractor engine load is carried out a plurality of times.

The transmission ratio increments only if a predetermined number of successive predictions indicates that the engine will not be overloaded, as represented by the comparison at step 57, which confirms whether four successive change up flags are set. In one embodiment of the invention the preferred number of successive change up flags is four; and in another embodiment it is three. Other predetermined numbers may be programmed in other embodiments of the invention.

In any event if the result of the comparison at step 57 is a logic state '1', the software calls a subroutine (step 58) that increments the transmission ratio, e.g. using microprocessor 29' if present.

The software then loops iteratively, thereby repeatedly assessing the need for transmission ratio shifts. In practice the software samples the mass flow rate once per cycle of plunger 26 (i.e. about once every 1.4 seconds in a New Holland D1010 "Cropcutter" baler).

If comparison 52 indicates that the sensor door position corresponding to mass flow rate, and optionally the PTO or engine, is overloaded, the control logic moves to step 59, that is a precursor to decrementing the transmission ratio.

Step 59 represents a comparison of the assessed flow rate (and, optionally, the PTO and engine loadings) against stored optimal values. If the flow rate is greater than the stored optimal value by a second predetermined amount that is less than a further predetermined amount, a change down flag is set (step 60). At step 61 the number of successive change down flags that are set is counted, and if the number is less than a predetermined value (preferably four) loops the control logic back to step 51 to carry out a further assessment of whether the transmission ratio should decrement. Only when the predetermined number (e.g. four, as noted) of successive change down flags is set does the software call a ratio change down subroutine (step 62). The change down may be implemented e.g. by microprocessor 29'.

Preferably the comparison at step 59 makes use of the data shown graphically in FIG. 5 and stored in the vehicle ROM. In the case of the step 59 comparisons the mass flow rate, represented by the swath density (i.e. x axis) values in FIG. 5 is compared against an optimal (overload) value for the selected gear ratio. Thus in the case of gear B6, the optimal swath density value is represented by point 86 on line 85. If the actual swath density exceeds 25 t/hr in ratio B6, subroutine 62 is called causing a ratio decrement to gear B5. The control logic functions similarly for the optimal values 87–90 corresponding respectively to the ratio shifts to gears B4–B1.

If the comparison at block 59 indicates that the assessed mass flow rate is greater than optimal by more than a stored further predetermined amount, the logic bypasses step 62 in favor of step 63 that sets a so-called "fast change down" flag (e.g. a bit in RAM). The software then functions as before except that, as indicated at step 64, it is necessary for a lesser number (e.g. two) of successive fast change down flags to be set for the transmission to decrement by means of subroutine 62 as described above.

The transmission changes are timed to coincide with a predetermined position in the reciprocal movement of the baler plunger. In the New Holland D1010 "Cropcutter" baler this is when the baler crank is not 130°–185° from fdc.

Although the method of the invention has been described in relation to software control of microprocessor functions, in turn controlling sub-systems of the combination 11/10, the method may be implemented in other ways e.g. using pneumatic or hydraulic control elements.

In determining at step 55 (FIG. 4) whether the relevant inhibit change up set point would be exceeded, the software employs a steady state reference model, that may also be stored in ROM, to make the prediction. The reference model predicts the engine loading that would result if the proposed transmission shift were to be made, taking account of the values of various variables prevailing at the time of the prediction.

Figure 6A:
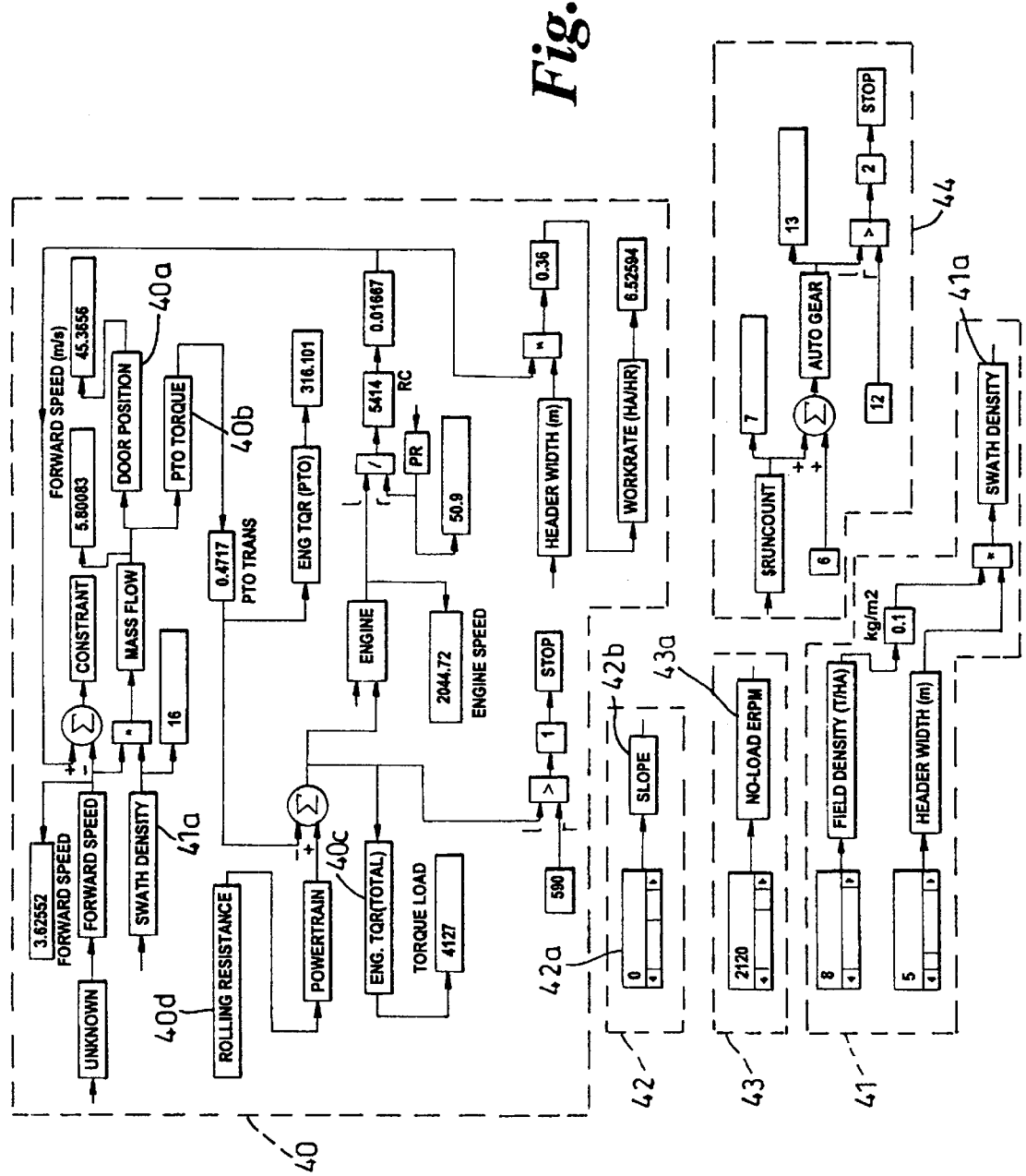

FIG. 6 shows the reference model in a schematic form, in which both linear and non-linear functions are represented by the rectangular blocks.

The model, which incorporates mathematical representations of the sub-systems described hereinabove, and the relationships derived from field evaluation tests includes a main iterative loop 40 and a number of subroutines 41–44, 46 and 47.

At start up, subroutine 41 represents one way of calculating a set of swath density values represented by block 41a, by multiplying a field density value, determined e.g. from field measurements, by a combine header width value that is, in effect, a swath density value. A range of the resulting swath density values is thereby stored, so that the model may be parameterized according to the prevailing swath density for each operation.

At startup, subroutine 42 calculates an initial value representative of the field slope, based on the output of an inclinometer on the tractor or baler and represented schematically by numeral 42a. The resulting field slope value 42b is used to allow for increases, in the overall loading on the tractor engine, resulting from operation of the tractor to pull a baler up an incline.

At startup, subroutine 43 calculates an initial value 43a of engine speed at no load.

Subroutine 44 increments from the lowest to the highest available gear ratio (within transmission limits), and enables the main loop to run with each new transmission ratio. Subroutine 44 thus permits calculation of the startup values at blocks 41–43 in each of a range of transmission ratios; and also permits operation of main loop 40 in each of the ratios of the range.

In a preferred form of the reference model main loop 40 calculates inter alia the sensor door position 40a, the PTO shaft torque 40b and the vehicle rolling resistance 41d using values generated by the startup subroutines 41–43. The results of the calculations in main loop 40 are plotted in a lookup table, represented graphically by graph 46a in output routine 46.

The calculations carried out in main loop 40 preferably take place during one or more calibration runs of the tractor/baler combination, in the first few minutes or seconds of operation. Optionally the software may permit the tractor operator to select a calibration mode of operation at any time.

Initially during the calibration run the control software selects the lowest transmission ratio of the range suitable for baling operations. Once the calibration is complete in that ratio the subroutine 44 increments the transmission ratio by one step. The calibration operation then repeats.

Figure 7:
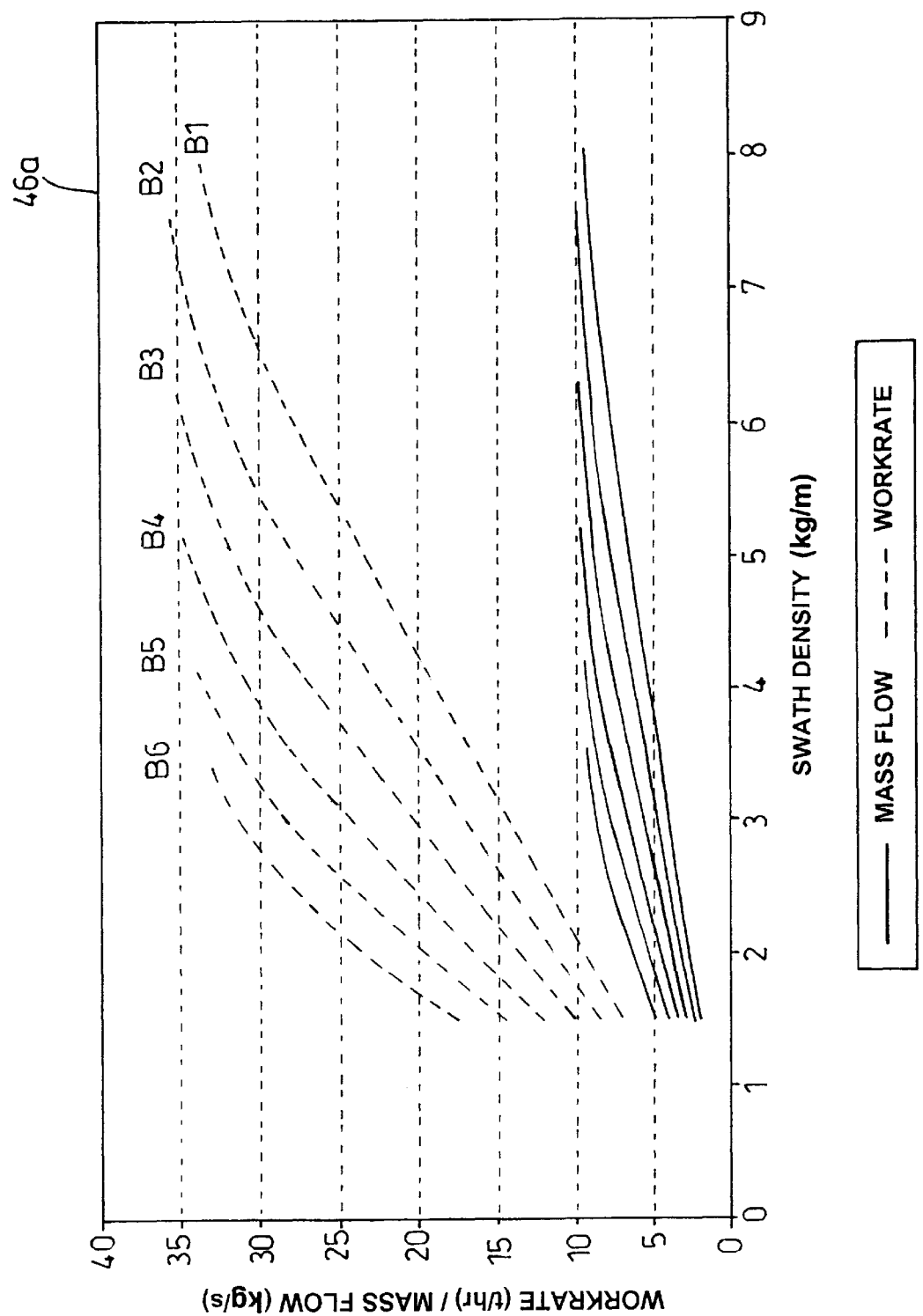
FIGS. 7 and 8 are graphical representations of outputs of the reference model of FIG. 6.
Figure 8:
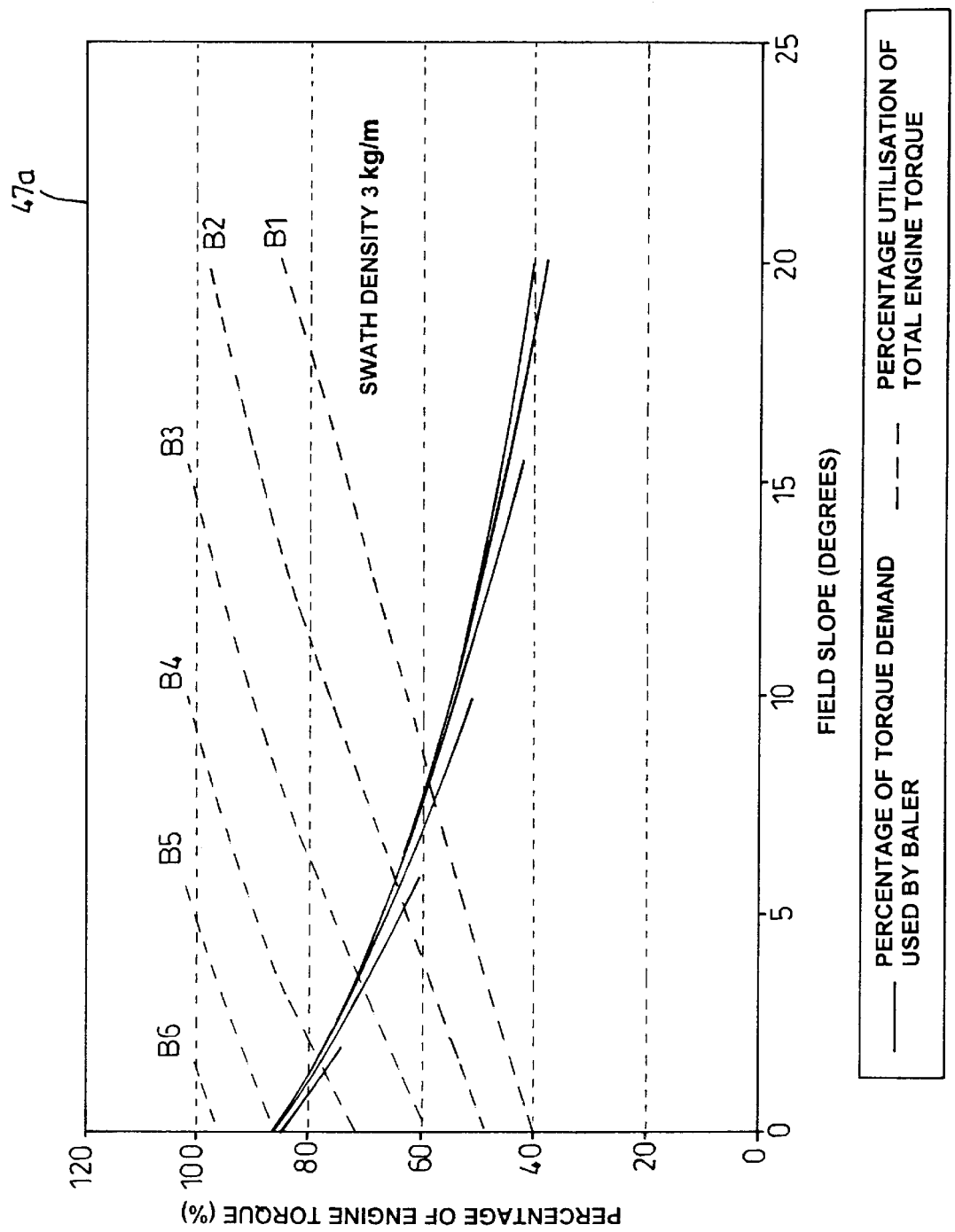

This process repeats iteratively until the calibration is complete for all the transmission ratios that are suitable for baling operations. The result then is the series of plots represented graphically at 46a and 47a and shown in more detail in FIGS. 7 and 8. The FIGS. 7 and 8 plots are subsequently used, during operation of the baler, to determine the tractor/baler work rate in dependence on the prevailing swath density.

Figure 9:
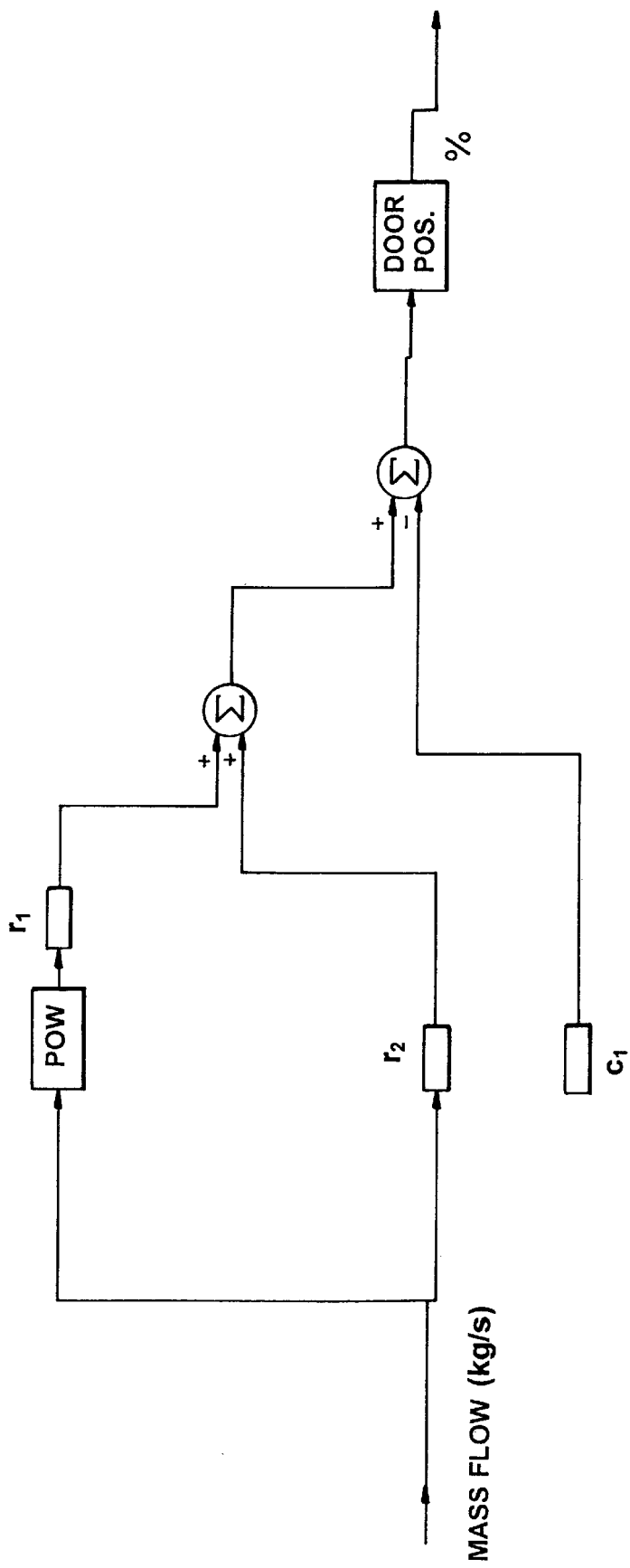
FIGS. 9 and 10 show parts of the reference model of FIG. 6 in more detail.
Figure 10:
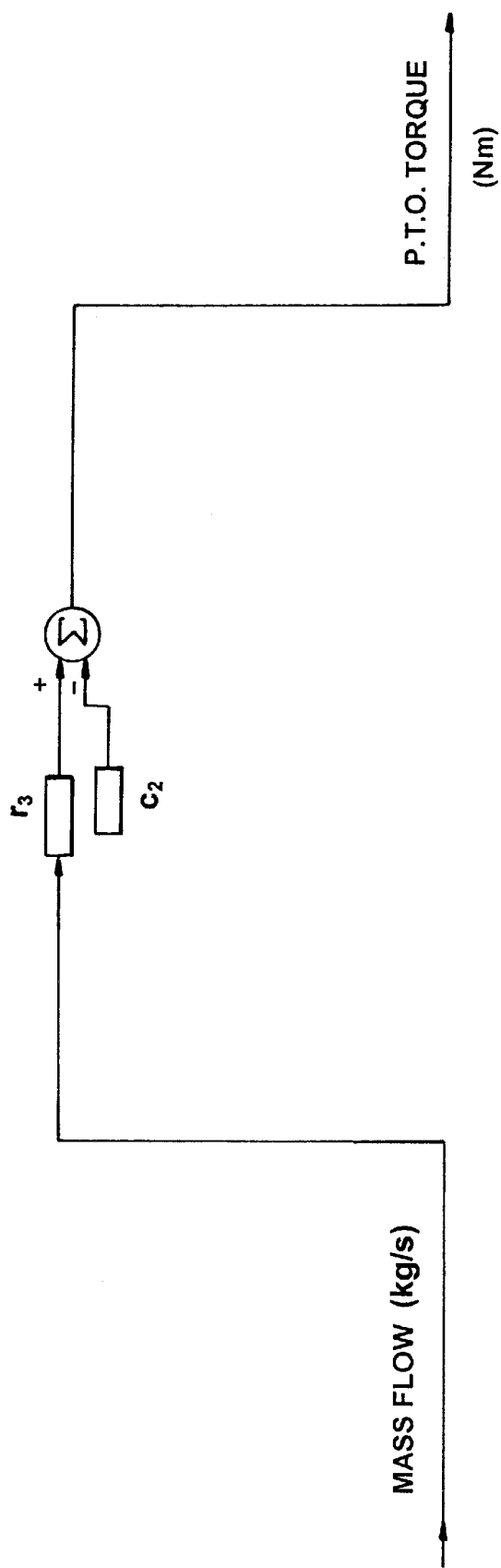

FIGS. 9 and 10 show respectively the calculation of the sensor door position and the PTO torque value at startup, as represented by blocks 40a and 40b in FIG. 6.

The relationship between the flow rate of biological material and the sensor door position has been found experimentally to be expressed by:

$$P = r_1 \cdot m^2 + r_2 \cdot m - c_1 \quad (1)$$

In which:
P is the sensor door position expressed as a percentage of its range of possible movement;
m is the flow rate of biological material in kg/s;
$c_1$ is a constant; and
$r_1$ and $r_2$ are coefficients.

The actual values of $c_1$, $r_1$ and $r_2$ have been determined from field trials.

FIG. 9 shows this expression in functional block form, as carried out at block 40a in subroutine 40 of FIG. 6.

Similarly the relationship between the PTO shaft torque and the flow rate of biological material may be expressed by:

$$T = r_3 \cdot m - c_2 \quad (2)$$

In which:
T is the PTO shaft torque in Nm;
m is the flow rate of biological material in kg/s;
$c_2$ is a constant; and
$r_3$ is a coefficient.

The actual values of $c_2$ and $r_3$ have been determined from field trials.

Although the relationships defining the variables are related by expressions such as Equations (1) and (2) herein, the actual values used in the reference model may be in the form of pre-calculated values or may be calculated in real time on the basis of outputs of the various sensors on the tractor/baler combination. In practice the model will contain a mixture of pre-calculated values such as parameters of the tractor/baler combination; and values that are calculated in dependence on instantaneously prevailing sensor values.

Although the preferred form of the reference model is a steady state model, this does not mean that the model is invariant. On the contrary, the model is periodically updated (e.g. once per a set number of clock pulses). Consequently each comparison with the reference model takes account of changes in the conditions under which the tractor/baler combination operates.

As noted, one way of visualizing the model outputs is in graphical form. The respective output graphs 46a and 47a of the subroutines 46 and 47 are shown enlarged as FIGS. 7a and 8.

In operation the reference model predicts the work rate of the tractor and baler combination for a selected range of crop densities, combine header widths (crop density×header width=swath density) and chosen field slope, for the transmission gear engaged, and presents the results in graphical form. When the upper limit of the selected swath density range is attained, or the pre-set engine load limit is exceeded, the simulation automatically increments the gear selection and repeats the calculations. Work rate is defined in terms of the crop tonnage baled per hour (mass flow rate through the baler): in level field conditions the baler torque requirement, via the PTO, is the main source of engine loading.

The specific actions performed by the model are as follows:
  the values of crop density, header width and field slope are selected;
  the model is initiated under the following conditions:
    transmission gear=B1;
    forward velocity=unknown;
    no-load engine speed=2120 erpm (1000 PTO rpm); and
    swath density=minimum of selected range;
  the model then proceeds through an iterative process to converge on the steady state engine speed, and therefore forward velocity, which satisfies the calculated loading under initialized conditions;
  the value of swath density is incremented and the iterative process repeated; and
  the calculations are repeated until either the maximum swath density is reached or the engine is overloaded, at which point the transmission gear is incremented and the swath density range reset to the lower limit.

As seen from a typical output of the simulation, shown in FIG. 7, at lower end of the swath density range the theoretical work rate increases as the transmission gear increments. This is as would be expected, due to the associated increase in forward speed. However, above swath densities of 3.5 kg/m the torque output of the tractor engine becomes limiting in successive gears. The increased curvature at the upper limit of each transmission gear plot is due to the more rapid reduction in engine speed as the loading on the engine increases beyond the governor line and the engine speed reduces along the maximum torque curve.

As can be seen from FIG. 8, the proportion of engine output utilized by the baler varies considerably over the range of field slope displayed. On a level field with the given swath density, over 80% of the power demand on the tractor originates from the baler via the PTO shaft. However, if the slope of the field increases above 15° then the majority of the power output of the tractor is required to overcome field slope and rolling resistance, via the transmission, axles and tires. The limiting factor of field slope on the theoretical maximum work rate is also demonstrated: the tractor and baler could satisfactorily operate in gear B4 on a level field, but the engine would be overloaded, necessitating a down change, if the field slope increased above 10°.

Although not shown as an input to the reference model of FIG. 6 or the method steps of FIG. 4, an optional feature of the invention is a further sensor, that may be mounted as illustrated schematically by reference numeral 37 at the front of tractor 10, for the purpose of detecting heaps in the swaths.

Heap sensor 37 may include a mechanical probe connected to a transducer, the probe being moveable on contact with a swath heap to cause the transducer to generate a swath signal. The transducer may be operatively connected to one or more of the microprocessors 29, e.g. via CAN-BUS 31.

Alternatively heap sensor 37 may be an optosensor or a radar or an ultrasound sensor, for example.

The output signal from the heap sensor may for example trigger the calling of a subroutine that causes rapid decrementing of the transmission ratio temporarily to reduce the forward speed of the tractor/baler combination so that the pre-compression chamber does not become clogged by the straw in the swath heap.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. A method of controlling a combination of a baler operatively connected to a tractor comprising the steps of:
    advancing a tractor/baler combination through a swath or a windrow of biological matter with the tractor PTO operating at a generally constant speed to power the baler and the baler operating to take up biological matter, said baler including a reciprocably movable baler plunger;
    during said advancing step, assessing the flow rate of biological matter in the baler;
    comparing the assessed flow rate with an optimal flow rate; and
    if the assessed flow rate differs from the optimal flow rate by more than a predetermined amount, changing the speed of advancement of the tractor by at least one gear change when said plunger occupies a predetermined position during said reciprocal movement, thereby changing the flow rate of biological matter into the baler, said tractor including an engine providing operative power for said tractor and said baler, and a transmission operatively coupled to said engine for changing the speed of movement of said tractor without changing a speed of operation of said engine by changing transmission ratios.

2. The method of claim 1 wherein the step of shifting the tractor transmission includes incrementing the tractor transmission ratio if the assessed flow rate is less than an optimal flow rate by more than a first said predetermined amount; and decrementing the tractor transmission ratio if the assessed flow rate is more than an optimal flow rate by more than a second said predetermined amount.

3. The method of claim 2 wherein the speed of operation of said tractor engine is maintained generally constant during advancing of the tractor/baler combination.

4. The method of claim 3 wherein the step of assessing the flow rate further includes the step of:
    periodically detecting at least one of the parameters of the set including:
        a baler packer drive shaft torque;
        a rotary feeder driveshaft torque;
        a tractor power take-off shaft torque;
        a baler packer fork conrod force; and
        a position of a sensor door in a pre-compression chamber of the baler;
    generating a signal indicative the detected parameter that is proportional to the said assessed flow rate; and
    using the said signal, to compare the assessed flow rate against the optimal flow rate.

5. The method of claim 4 wherein when the step of comparing the assessed flow rate with the optimal flow rate, indicates that the assessed flow rate is less than the optimal flow rate by more than the first predetermined amount, the method includes the steps of:
    predicting the load on the tractor engine in the event of incrementing of the tractor transmission ratio by one ratio increment, and
    only incrementing the said transmission ratio if the predicted load is less than a predetermined maximum.

6. The method of claim 5 wherein the step of predicting the load on the tractor engine includes the sub-steps of:
    assessing the engine torque and generating a signal indicative thereof; and
    inputting the resulting engine torque signal into a reference model to effect said prediction.

7. The method of claim 6 wherein the step of assessing the engine torque includes operating a torque sensor operatively associated with a tractor engine flywheel.

8. The method of claim 7 wherein the step of predicting the load on the tractor engine, is carried out a plurality of times and wherein the said transmission ratio is incremented only if a predetermined number of consecutively predicted loads is less than said predetermined maximum.

9. The method of claim 2 wherein the step of comparing the assessed flow rate is carried out a plurality of times and wherein said transmission ratio is decremented only if a further predetermined member of consecutive said assessments indicates a need to decrement the transmission ratio.

10. The method of claim 9 wherein when the step of comparing the assessed flow rate indicates that the assessed flow rate is greater than the optimal flow rate by a said second predetermined amount the further predetermined number of consecutive said assessments is greater than when the assessed flow rate is greater than the optimal flow rate by a further predetermined amount, that is greater than the second predetermined amount.

11. The method of claim 1 wherein a programmable processor is operatively connected to said baler and said tractor to receive and process signals indicative of one or more of:

a torque value for a driveshaft associated with a packer fork in said baler;

a torque value for a driveshaft associated with a rotary feeder in said baler;

a torque value for a power takeoff shaft of said tractor;

a force value for a conrod of said packer fork;

a position of a sensor door associated with a pre-compression chamber of the baler; and the tractor transmission ratio.

12. The method of claim 11 wherein the processor continuously detects signals indicative of one or more of said sensor door position, tractor power takeoff shaft torque and a torque value for said tractor engine and processes the resulting values corresponding to a predetermined part of the plunger cycle.

13. The method of claim 12 wherein said processor continuously detects signals indicative of one or more of the said sensor door position, tractor power takeoff shaft torque and tractor engine torque and averages the resulting values over a cycle of the baler plunger.

14. The method of claim 13 wherein said processor maintains the tractor engine speed generally constant, regardless of the engine loading.

15. The method of claim 14 the programmable processor a memory having for comparison purposes at least one optimal flow rate values.

16. The method of claim 4 wherein when the detecting step includes detecting the sensor door position, the detection occurs for the duration of the portion of the baler plunger cycle in which the baler plunger is at a predetermined position relative to a front dead center position.

17. The method of claim 16 wherein said baler includes cutter knives, said method further comprising the steps of:

detecting whether the cutter knives of the baler are engaged; and adjusting the assessed flow rate of biological matter in response to a detection of engagement of said cutter knives.

18. The method of claim 17 wherein said adjusting step compensates for the number of cutter knives engaged.

19. In a combination of a baler operatively connected to a tractor to receive operative and motive power therefrom, the baler having a packer including a packer fork, a rotary feeder, a pre-compression chamber having a sensor door, and a plunger for compacting crop material into bales, the tractor having an engine, a transmission operatively connected to said engine to provide a plurality of transmission ratios to enable corresponding motive speeds for a given speed of operation of said engine, and a power takeoff shaft operatively associated with said engine to provide operational power for said baler, the improvement comprising:

a baler packer driveshaft torque sensor including a strain gauge operatively connected to the packer or rotary cutter driveshaft and connected in a bridge circuit;

a torque sensor for detecting the PTO shaft torque;

a packer fork conrod force sensor including a strain gauge operatively connected to the packer conrod and connected in a bridge circuit;

a sensor door position detector including an LVDT or rotary potentiometer operatively connected to generate a signal indicative of the position of said sensor door;

a programmable processor operatively to the sensors for detecting at least one of the following parameters:

torque for a driveshaft of said baler packer;

torque for a driveshaft for said rotary feeder;

torque for the tractor power take-off shaft;

force on a conrod associated with the baler packer fork;

the position of the pre-compression chamber sensor door; and the tractor transmission ratio;

said programmable processor being operable to vary the motive speed of said tractor in response to a perceived flow rate of said crop material in said baler.

20. The combination of claim 19 further comprising:

a swath heap sensor located in front of the baler pre-compression chamber for generating a swath heap signal indicative of a swath heap, the programmable processor being programmed to reduce the motive speed on generation of a said swath heap signal.

21. The combination of claim 20 further comprising:

a baler plunger position sensor that generates a signal indicative of the position of the baler plunger, the baler plunger position sensor being operatively connected to feed the said position signal to the programmable device.

22. The combination of claim 21 wherein the programmable processor includes a memory having for comparison purposes at least one optimal flow rate value.

23. The combination of claim 22 further comprising:

an inclinometer that generates an inclination signal indicative of when the combination is ascending or descending a slope, the inclination signal being input to the programmable processor.

24. The combination of claim 23 further comprising:

a sensor for determining a rolling resistance of the combination and generating a rolling resistance signal indicative thereof, the rolling resistance signal being input to the programmable processor.

25. The combination of claim 24 wherein the programmable processor has stored in said memory a steady state reference model predictive of the behavior of the combination for variations in at least one of the following parameters:

transmission ratio of the tractor;

density of crop material on the ground for feeding into the baler; and a range of slope inclinations over which said combination is movable.

* * * * *